United States Patent Office 3,379,725
Patented Apr. 23, 1968

3,379,725
SUBSTITUTED HEXAHYDRO-1,3,5-TRIAZINES
Werner Schäfer and Richard Wegler, Leverkusen, Ludwig Eue, Cologne-Stammheim, and Helmuth Hack, Opladen, Germany, assignors to Farbenfabriken Bayer Aktiengesellschaft, Leverkusen, Germany, a corporation of Germany
No Drawing. Filed Apr. 2, 1965, Ser. No. 445,233
Claims priority, application Germany, Apr. 9, 1964, F 42,564
27 Claims. (Cl. 260—248)

The present invention relates to particular substituted hexahydro-1,3,5-triazines having significant herbicidal properties and to the production and use thereof.

It is known that those substituted ureas used as the starting materials for the production of the particular compounds of the present invention, for example, 1-methyl-3-(2-benzothiazolyl)-urea, exhibit strong herbicidal properties (cf. U.S. Patent No. 2,756,135).

It is an object of the present invention to provide an improvement in the herbicidal art and, more specifically, to provide substituted hexahydro-1,3,5-triazines having strong herbicidal properties, especially as compared with those of substituted ureas heretofore used.

It is another object of the present invention to provide particular substituted hexahydro-1,3,5-triazines having significant herbicidal properties which may be used on post-emergence plants or weeds which are to be destroyed, and which when so used are extremely effective.

It is still another object of the present invention to provide a process for producing such substituted hexahydro-1,3,5-triazines.

It is still another object of the present invention to provide herbicidal formulations including such particular substituted hexahydro-1,3,5-triazines in admixture with a carrier vehicle and especially a dispersible liquid or a dispersible finely divided solid carrier vehicle, with such triazine being present in a herbicidally effective amount for killing the undesired plants and/or weeds.

It is still another object of the present invention to provide a method of using such substituted hexahydro-1,3,5-triazines by applying such triazines alone or in admixture with a carrier vehicle to such weeds and the soil area where such weeds are growing in a herbicidally effective amount of the particular triazine in question.

It is a further object of the present invention generally to provide new particular substituted hexahydro-1,3,5-triazines having significant herbicidal properties, herbicidal formulations or compositions containing the same with a carrier vehicle, as well as methods of producing such triazines and using the same in destroying and controlling weeds and undesired plants in the soil.

Other and further objects of the present invention will become apparent from a study of the within specification and the accompanying examples.

It has now been found in accordance with the present invention that the particular substituted hexahydro-1,3,5-triazines of the general formula:

(I)

wherein
Z represents an oxygen or sulfur atom;
R represents a hydrocarbon radical containing 1 to 4 carbon atoms;
R' represents a hydrocarbon radical containing 1 to 6 carbon atoms, which may optionally contain heteroatoms; and
A and B, which may be the same or different, represent hydrogen atoms or hydrocarbon radicals containing 1 to 4 carbon atoms, or A and B together represent a hydrocarbon bridge member containing 3 to 5 carbon atoms;
exhibit strong herbicidal properties, especially when they are used after the emergence of the plants whch are to be destroyed.

The particular substituted hexahydro-1,3,5-triazines of the above-noted general Formula I are obtained when substituted ureas or thioureas of the general formula:

(II)

wherein Z, R, A and B have the same meanings as set forth above, are reacted with formaldehyde and a primary amine of the general formula:

$$R'\text{—}NH_2 \qquad (III)$$

wherein R' has the same meaning as set forth above.

It is surprising that such substituted hexahydro-1,3,5-triazines according to the present invention should have an appreciably higher herbicidal activity and, in particular, a selective herbicidal activity, as compared with the kinds of activity possessed by the ureas and thioureas known at present and in fact used as the starting materials for the production of the new triazines of the present invention. These known ureas and thioureas are believed to be the chemically most closely related active compounds with the same type of activity. The new compounds according to the present invention thus constitute a valuable addition to the art.

In accordance with a particular embodiment of the present invention, when 1-(2-benzthiazolyl)-3-methyl-urea, formaldehyde and n-butylamine are, for example, used as the starting materials, the reaction can be represented by the following equation:

(IV)  (V)  (VI)

(VII)

The ureas and thioureas to be used as starting materials, in accordance with the present invention, are clearly characterized by general Formula II. In this formula, Z is an oxygen or sulfur atom, R is preferably an alkyl radical containing 1 to 4 carbon atoms or an alkenyl radical containing 2 to 4 carbon atoms and A and B preferably represent hydrogen atoms or alkyl or alkenyl containing up to 4 carbon atoms or, when A and B are joined, they preferably stand for unsaturated hydrocarbon bridge members, such as a 1,4-butadiene bridge member.

The primary amines to be used as starting materials, in accordance with the present invention, are clearly characterized by general Formula III. In this formula, R' preferably denotes an alkyl radical containing 1 to 6 carbon atoms or an alkenyl radical containing 2 to 6 carbon atoms, which may optionally contain oxygen, sulfur and/or nitrogen atoms. In these cases, the preferred radicals are alkoxy, alkylmercapto, alkylamino or dialkylamino-alkyl radicals.

As examples of substituted ureas or thioureas corresponding to general Formula II which can be used according to the present invention, there may be mentioned 1-[2 - benzthiazolyl]-3-methylurea, 1-[2-benzthiazolyl]-3-butylurea, 1-[2-benzthiazolyl]-3-allylurea, 1-[2-benzthiazolyl] - 3-methyl-thiourea, 1-[2-(4-methyl)-thiazolyl]-3-methyl-thiourea and 1-[2-(4-methyl)-thiazolyl]-3-methyl-urea.

As examples of primary amines corresponding to general Formula III which can be used according to the present invention, there may be mentioned methylamine, ethylamine, n-propylamine, n-butylamine, isobutylamine, allylamine, 3 - methoxy-propylamine, 2-methoxy-ethyl-amine and 3-dimethylamine-propylamine.

Organic solvents, such as cycloaliphatic ethers, especially $C_5$–$C_6$ cycloalkyl ethers, for example dioxan, and solvents with a high dipole moment, such as dialkyl-alkanoylamides, especially $C_1$–$C_4$ diloweralkyl-$C_1$–$C_4$ lower alkanoyl amides, for example dimethyl formamide, can be used as the diluents, as well as water. Mixtures of such reaction media may also be used.

The reaction temperatures in accordance with the present invention may be varied within a fairly wide range. In general, the reaction is carried out at a temperature substantially between about 0 and 150° C., preferably substantially between about 20 to 100° C.

When carrying out the process of the present invention, it is expedient to use 2 moles of a solution of formaldehyde for each mole of the substituted urea or thiourea and, after a reaction period of about half an hour, to add 1 mole of a primary amine.

Advantageously, the compounds according to the present invention have very good herbicidal properties, particularly if they are applied after the emergence of the plants. They can also be used for selective weed control in agricultural cultivation, for instance on beets, tomatoes, potatoes and beans.

The compounds according to the present invention can be converted into the usual compositions such as emulsifiable concentrates, spray powders, pastes, soluble powders, dusting agents and granulates. These are prepared in known manner, for instance by extending the active compounds with dispersible carrier vehicles, including solvents and/or solid particle carriers, optionally with the use of emulsifiers and/or dispersing agents (cf. Agricultural Chemicals, March 1960, pages 35–38). The following may be chiefly considered as adjuvants for this purpose: solvents, such as aromatic hydrocarbons (for example, chlorobenzenes), paraffins (for example, petroleum fractions), alcohols (for example, methanol or butanol, isobutanol, etc.), amines (for example, ethanolamine), aliphatic fatty acid esters, such as ethyl acetate, etc., dimethyl formamide and water; solid carriers, such as natural ground minerals (for example, kaolins, aluminas, talc or chalk) and synthetic ground minerals (for example, highly-dispersed silicic acid or silicates); emulsifiers such as non-ionic and anionic emulsifying agents (for example, polyethylene oxide esters of fatty acids, polyethylene oxide ethers of fat alcohols, alkyl sulfonates and aryl sulfonates), and dispersing agents, such as lignin spent sulfite liquors and methyl-cellulose.

The active compounds according to the present invention may be present in such compositions advantageously in the form of mixtures with known active compounds.

In general, the compositions contain substantially between about 0.1 and 95 percent by weight of the active compound, preferably substantially between about 0.5 and 90 percent by weight.

The compounds according to the present invention, which are usable per se or in the form of their compositions are preferably applied after the emergence of the plants which are to be destroyed. Their application is carried out by the usual methods, for example, by watering, spraying, vapor spraying, dispersing or dusting. The amounts to be used during this operation depend on a variety of factors, such as plant, soil, weed and weather conditions. In general, the amounts applied are substantially between about 2 and 10 kg. per hectare and the concentrations of the active compounds vary substantially between about 0.01 and 0.5%.

The activity of the compounds according to the present invention is almost exclusively restricted to the existing vegetation. This can prove to be a considerable advantage when new cultivated plants are to be sown in the soil after weed control has been carried out.

The following examples are given for the purpose of illustrating, while not limiting, the present invention.

EXAMPLE A

Post-emergence test.
Solvent: 4 parts by weight acetone.
Emulsifier: 0.2 part by weight benzyloxy-polyglycol ether.

To produce a suitable preparation of active compound, 1 part by weight of active compound is mixed with the stated amount of solvent, the stated amount of emulsifier is added and the concentrate is then diluted with water to the desired concentration.

Test plants of about 5–15 cm. height are sprayed with the preparation of the active compound until just dew moist. After three weeks, the degree of damage to the plants is determined and characterised by the values 0–5, which have the following meaning:

0—No effect.
1—A few slightly burnt spots.
2—Marked damage to leaves.
3—Some leaves and parts of stalks partially dead.
4—Plant partially destroyed.
5—Plant completely dead.

The active compounds, their concentrations and the results obtained can be seen from the following table:

TABLE

| Active Compound | Percent Concentration of Active Compound | Millet | Beet | Oats | Cotton | Wheat | Mustard | Tomatoes | Beans | Gallant soldier | Chickweed | Flax | Stinging Nettles | Potatoes |
|---|---|---|---|---|---|---|---|---|---|---|---|---|---|---|
| (VIII) [structure] | 0.2 | 5 | 4 | 5 | 4 | 5 | 5 | 1 | 3 | 5 | 5 | 5 | 5 | 0–1 |
| | 0.15 | 5 | 2 | 4–5 | 4 | 4 | 5 | 0 | 1 | 5 | 5 | 5 | 5 | 0 |
| | 0.1 | 5 | 1–2 | 4 | 3 | 4 | 5 | 0 | 1 | 5 | 5 | 5 | 5 | 0 |
| | 0.05 | 5 | 1 | 3 | 1 | 3 | 5 | 0 | 0 | 5 | 5 | 5 | 5 | 0 |

TABLE—Continued

| Active Compound | Percent Concentration of Active Compound | Millet | Beet | Oats | Cotton | Wheat | Mustard | Tomatoes | Beans | Gallant soldier | Chickweed | Flax | Stinging Nettles | Potatoes |
|---|---|---|---|---|---|---|---|---|---|---|---|---|---|---|
| (IX) [benzothiazole with N-CH₃, ring with N-CH₃] | 0.2 | 5 | 5 | 5 | 5 | 5 | 5 | 5 | 4 | 5 | 5 | 5 | 5 | 1 |
|  | 0.15 | 5 | 4 | 4-5 | 4 | 4 | 5 | 4 | 3 | 5 | 5 | 5 | 5 | 0 |
|  | 0.1 | 5 | 3 | 4 | 3 | 3 | 5 | 2 | 2 | 5 | 5 | 5 | 5 | 0 |
|  | 0.05 | 5 | 2 | 3 | 2 | 2 | 5 | 1 | 1 | 5 | 5 | 5 | 5 | 0 |
| (VII′) [benzothiazole with N-CH₃, N-butyl] | 0.2 | 5 | 5 | 5 | 3 | 5 | 5 | 4-5 | 5 | 5 | 5 | 5 | 5 | 3 |
|  | 0.15 | 5 | 4 | 4-5 | 3 | 5 | 5 | 4 | 4-5 | 5 | 5 | 5 | 5 | 2 |
|  | 0.1 | 5 | 3 | 4 | 3 | 5 | 5 | 4 | 4 | 5 | 5 | 5 | 5 | 0 |
|  | 0.05 | 5 | 1 | 2 | 1 | 3 | 3 | 3 | 3 | 5 | 5 | 5 | 5 | 0 |
| (X) [benzothiazole with N-CH₃, N-allyl] | 0.2 | 5 | 5 | 5 | 3-4 | 4-5 | 5 | 2 | 4 | 5 | 5 | 5 | 5 | 1 |
|  | 0.15 | 5 | 4-5 | 4-5 | 3 | 4 | 5 | 1 | 3 | 5 | 5 | 5 | 5 | 0 |
|  | 0.1 | 5 | 4 | 4 | 3 | 4 | 5 | 0 | 2 | 5 | 5 | 5 | 5 | 0 |
|  | 0.05 | 5 | 4 | 4 | 2 | 3 | 5 | 0 | 1 | 4 | 5 | 5 | 5 | 0 |
| (XI) [benzothiazole with thione, N-CH₃, N-(CH₂)₃-OCH₃] | 0.2 | 5 | 1 | 4 | 1 | 4 | 4 | 2 | 1 | 5 | 5 | 5 | 5 | 0 |
|  | 0.15 | 4 | 0 | 3 | 0 | 3-4 | 3-4 | 1 | 0 | 4-5 | 5 | 5 | 4-5 | 0 |
|  | 0.1 | 3 | 0 | 2 | 0 | 2 | 3 | 0 | 0 | 4 | 5 | 5 | 3 | 0 |
|  | 0.05 | 3 | 0 | 1 | 0 | 2 | 2 | 0 | 0 | 4 | 5 | 4 | 3 | 0 |

As may be seen from the table, where Compound VIII is used, a distinct herbicidal preference is shown for weeds as opposed to agricultural crops. In concentrations of 0.05% by weight, such compound is not detrimental to potatoes, beans or tomatoes to any extent, and is only slightly influential in retarding the growth of beets and cotton, although somewhat more influential in retarding the growth of oats and wheat. Thus, in such low concentration, this compound may be used selectively to rid a particular soil area of weeds and, if desired, also of oats and wheat, especially where oats and wheat had been previously planted in the area but because of a rotation of crops are being replaced by another plant crop, such as potatoes, beans, tomatoes, cotton or beets. Of course, at a concentration of 0.1% by weight, beans are slightly retarded in growth while beets are slightly more retarded, whereas cotton is more significantly retarded and oats and wheat are pronouncedly retarded in growth. By utilizing this somewhat larger concentration of Compound VIII, a gradient of selectivity may be provided wherein in addition to wheat and oats, cotton and to some extent beans and beets may be retarded in growth, such as in the case where tomatoes or potatoes are to be planted in consequence of a rotation of crops procedure. At a further increased concentration of 0.15% by weight, a preference for delaying growth in wheat and oats is still prevalent, and this it true also with respect to cotton, whereas beets and beans are still only slightly delayed in their growth. At a higher concentration of 0.2% by weight, only potatoes and tomatoes are unaffected to any extent, and the incremental differences in concentration may thus be used in accordance with the present invention to retard growth selectively, not only of weeds but of various agricultural plant crops, as the case may be, so as to preserve a particular soil acreage or area primarily for one or two types of plant crops to the exclusion of one or more others.

In the same way, considering Compound IX, it will be seen that at the low concentration of 0.05% by weight, effective inhibition of the growth of various weeds is attained with only somewhat pronounced retardation of growth of oats and slightly pronounced retardation of growth of beets, cotton and wheat. At such concentration, only slight retardation is exhibited with respect to tomatoes and beans while potatoes are unaffected completely. As the concentration increases to 0.1%, a consistent increase in retardation is attained consonant with that at the above-noted lower percent, and at 0.15% concentration generally beets, oats, cotton, wheat, tomatoes and beans are retarded pronouncedly in growth while potatoes remain unaffected. At the high concentration of 0.2%, just about complete retardation of growth is achieved with all but potatoes, these being only slightly retarded in growth. In this instance as well, incremental changes in concentration of the active compound may be used to selectively retard the growth of certain kinds of crops in addition to weeds, as may be desired, but in any case all weeds are destroyed even at the extremely low concentration utilized without seriously affecting a particular plant crop which may be desired to be maintained in a given soil acreage.

Compound VII' exhibits at a concentration of 0.05%, the consistent retardation of growth essentially completely of all weeds, save for mustard. At the increased concentration of 0.1%, such mustard is completely inhibited in growth as is wheat as well, whereas tomatoes, beans and oats are pronouncedly inhibited while beets and cotton are only somewhat inhibited. At the higher concentration of 0.15%, the inhibition relationship is retained and at the 0.2% concentration level, only cotton is able to withstand the herbicidal effect of the compound in question along with potatoes, which are not affected except at a concentration of 0.15% and to a greater extent at the 0.2% concentration level. Thus, at a low concentration practically all weeds are destroyed without seriously affecting most of the crop types, yet at increased concentrations selective inhibition may be attained.

The same is true regarding Compound X wherein at the 0.05% concentration, practically all the weeds are destroyed, with oats being pronouncedly retarded in growth along with the weed "gallant soldier," beets, cotton and wheat being only somewhat retarded in growth while beans are slightly retarded and potatoes and tomatoes completely unaffected. As the concentration increases to 0.1%, oats and wheat remain pronouncedly affected while beets and cotton are somewhat retarded in growth and beans slightly retarded. Potatoes and tomatoes remain unaffected at such concentration. Increasing the dosage to 1.5% results in a consistent further retardation of beets, oats, cotton, wheat and beans, while tomatoes are only slightly retarded in growth and potatoes still remain unaffected. At the high concentration of 0.2%, beets and oats are completely destroyed, wheat is substantially completely destroyed, beans are substantially destroyed, and cotton is destroyed to a significant extent. Tomatoes are only somewhat retarded in growth while potatoes are only slightly retarded. This instance as well illustrates the selective nature of the particular compound employed for inhibiting and/or retarding the growth of certain types of crops in addition to weeds, depending upon the incremental variations in the effective concentration utilized.

In the case of Compound XI, a particular degree of versatility is possible, since at the low concentration of 0.05%, substantial inhibition of growth of weeds is attained with little or no effect on the different kinds of crops. At 0.1% concentration, the same observations pertain, yet at 0.15% concentration, with substantially complete inhibition of the weeds, only significant inhibition of some kinds of crops also takes place, i.e., oats and wheat. At the high concentration of 0.2%, the relationship remains about the same, yet with only slight retardation of beets, cotton and beans, some retardation of tomatoes, and no retardation of potatoes in spite of the substantial retardation of the growth of oats in addition to the various weeds.

It will be appreciated by the artisan considering the statistics in the foregoing table that by the choice of a particular compound and/or combination of two or more thereof in accordance with the present invention, and by judicious selection of the particular concentration of the active compound or compounds utilized, one or more of the various kinds of crops can be destroyed or retarded in growth to a desired extent, along with the intended destroying of weeds, so as to provide soil acreage representing a more favorable environment for growing a given, different kind of crop, without weeds and other crops being also present to drain from the soil valuable nutrients meant for such given crop intended to be grown. Of course, the active compound, as aforesaid, may be used with a carrier vehicle of the foregoing type and applied in such concentrations at dosages at, for example, substantially between about 2–10 kilograms per hectare.

EXAMPLE 1

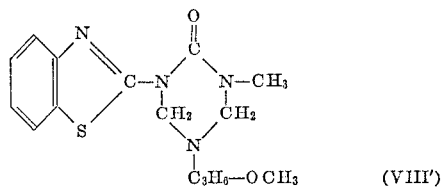

(VIII')

69 g. 1-[2-benzthiazolyl]-3-methylurea are suspended in 350 ml. dimethyl formamide and 67 g. of a 30% aqueous solution of formaldehyde are added to it. The temperature rises by 2° C. within 5 minutes during this operation. Stirring is continued at room temperature for half an hour and 30 g. 3-methoxy-propylamine are then added dropwise during the course of 10 minutes, the temperature rising from 20 to 39° C. The clear solution is then heated at 90–100° C. for 2 hours and thereafter cooled to 20° C. The product which crystallizes during this operation is filtered off and recrystallized from ethyl acetate. Yield: 74 g. 1-(2-benzthiazolyl) - 3 - methyl - 5 - ($\gamma$-methoxy)-propyl-hexahydro-triazinone-2 in the form of colorless crystals; M.P. 119–120° C.

EXAMPLE 2

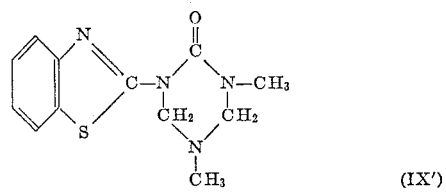

(IX')

33 g. 1-(2-benzthiazolyl)-3-methylurea are suspended in 200 cc. dimethyl formamide and 32 g. of a 30% aqueous solution of formaldehyde are added to it. Stirring is continued at room temperature for half an hour and 16 cc. of a 35% aqueous solution of methylamine are then added dropwise. Stirring is continued at room temperature for 3 hours. The entire solid material dissolves during this operation. The solution is thereafter heated at 100° C. for 2 hours, filtered to clarify it and evaporated in vacuo (14 mm. Hg). The remaining residue is recrystallized from isobutanol. Yield: 34 g. of colorless crystals; M.P. 161–162° C.

The following compounds are prepared in an analogous manner:

1-(2-benzthiazolyl) - 3 - methyl - 5 - ($\gamma$-methoxy)-propyl-hexahydro-triazin-thione-2:

(XI')

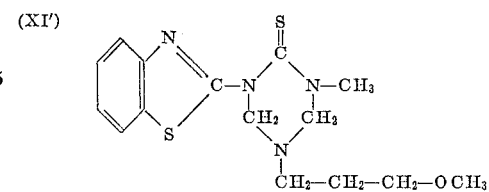

M.P.: 155–157° C.

1-(2-benzthiazolyl)-3-methyl-5-allyl-hexahydro-triazinone-2:

(X')

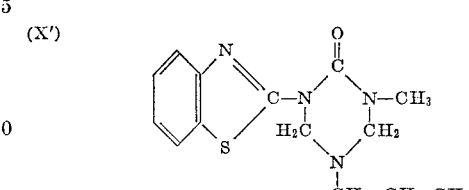

M.P.: 97–99° C.

1-(2-benzthiazolyl)-3-methyl-5-butyl-hexahydro-triazinone-2:

(VII″)

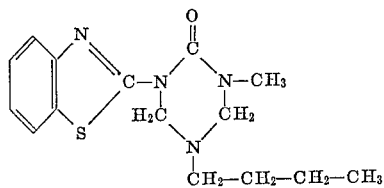

M.P.: 87–88° C.

1-(2-benzthiazolyl)-3-methyl-5-butyl - hexahydro - triazin-thione-2:

(XII)

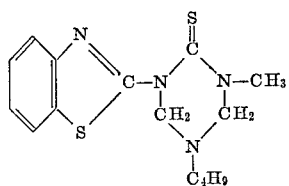

friable mass.

1-(2-benzthiazolyl)-3-methyl-5-allyl - hexahydro - triazin-thione-2:

(XIII)

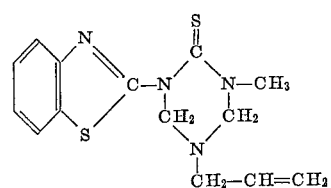

friable mass.

1-(2-benzthiazolyl)-3-allyl-5-methyl - hexahydro - triazin-thione-2:

(XIV)

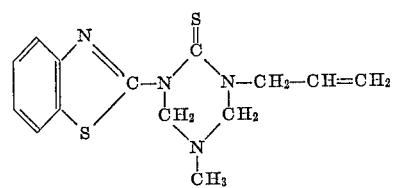

friable mass.

1-(2-benzthiazolyl)-3-allyl-5 - butyl - hexahydro - triazin-thione-2:

(XV)

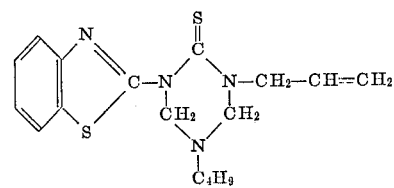

friable mass.

1-(2 - benzthiazolyl) - 3 - methyl - 5 - ethyl - hexahydro-triazinone-2:

(XVI)

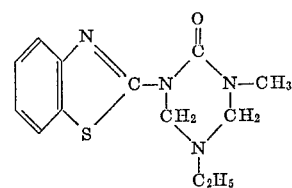

M.P. 156–158° C.

1-(2 - benzthiazolyl) - 3 - methyl - 5 - propyl - hexahydro-triazinone-2:

(XVII)

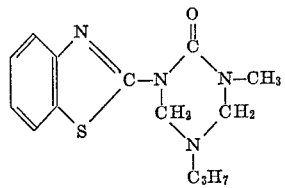

friable mass.

1-(2 - benzthiazolyl) - 3 - methyl - 5 - (γ - methylamino)-propyl-hexahydro-triazinone-2:

(XVIII)

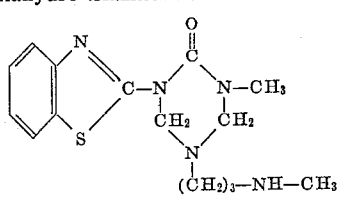

friable mass.

1-(2-benzthiazolyl)-3 - methyl - 5 - (γ - dimethylamino)-propyl-hexahydro-triazinone-2:

(XIX)

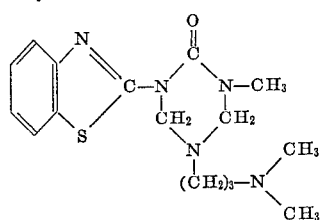

friable mass.

1-(4' - methylthiazol - 2' - yl) - 3 - methyl - 5 - propyl-hexahydro-triazinone-2:

(XX)

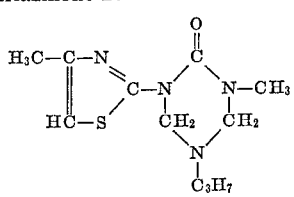

M.P.: 82–84° C.

1-(4'-methylthiazol-2'-yl)-3-methyl-5 - butyl - hexahydro-triazinone-2:

(XXI)

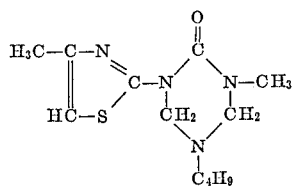

friable mass.

1-(4'-methylthiazol-2'-yl) - 3 - methyl - 5 - allyl - hexa-hydro-triazinone-2:

(XXII)

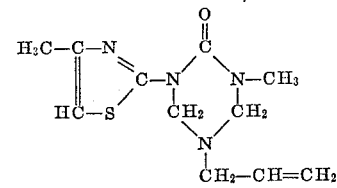

friable mass.

1-(4'-methylthiazol-2'-yl)-3,5-dimethyl-hexahydro-triazin-thione-2:

(XXIII)

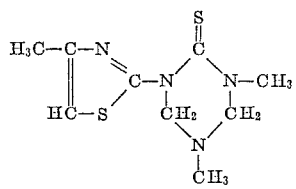

friable mass.

1-(4'-methylthiazol-2'-yl)-3-methyl-5-allyl-hexahydro-triazin-thione-2:

(XXIV)

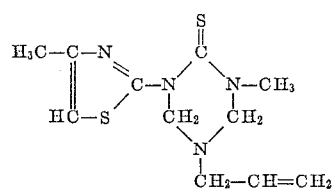

friable mass.

EXAMPLE 3

(XXV)

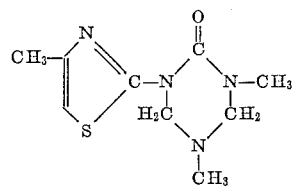

34 g. 1-[2-(4-methyl)-thiazolyl]-3-methylurea in 150 ml. dimethyl formamide are treated with 40 g. of a 30% aqueous solution of formaldehyde and stirring is continued at room temperature for 1 hour. 27 cc. of a 25% aqueous solution of methylamine are then added dropwise, the temperature rising slightly. Stirring is continued for 1 hour and the reaction mixture is then heated at 100° C. for 1 hour. The solvent is distilled off in vacuo and the last traces of solvent removed by evaporation in vacuo at a bath temperature of 100° C. The residue consists of 47 g. of an immobile oil.

Analysis.—$C_9H_{14}N_4OS$. Molecular weight, 226.2. Calculated: C, 47.65%; H, 6.20%. Found: C, 47.13%; H, 6.62%.

EXAMPLE 4

(XXVI)

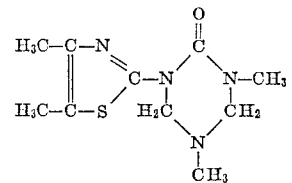

50 g. 1-[2-(4,5-dimethyl)-thiazolyl]-3-methylurea in 150 ml. dimethyl formamide are treated with 54 g. of a 30% aqueous solution of formaldehyde and stirred at room temperature for 1 hour. 27 ml. of a 25% aqueous solution of methylamine are then added dropwise, the temperature rising slightly.

The reaction mixture is stirred at room temperature for 1 hour and at 100° C. for half an hour. The clear solution is evaporated in vacuo and the residue recrystallized from ligroin. Yield: 25 g.; M.P. 109–111° C.

Analysis.—$C_{10}H_{16}N_4OS$. Molecular weight, 240. Calculated: C, 50%; H, 6.67%; N, 23.34%. Found: C, 50.05%; H, 6.86%; N, 23.22%.

The following compound was prepared in an analogous manner.

(XXVII)

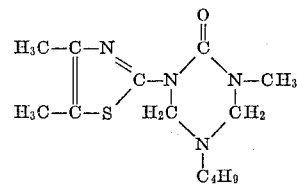

immobile oil.

Analysis.—$C_{13}H_{22}N_4OS$. Molecular weight, 282. Calculated: N, 19.30%. Found: N, 19.7%.

It will be appreciated, therefore, that a versatile process may now be provided in accordance with the present invention for the production of substituted hexahydro-1,3,5-triazines which comprises reacting a thiazolyl compound of the formula

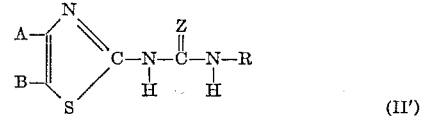

(II')

in which Z is selected from the group consisting of oxygen and sulfur, R is selected from the group consisting of lower alkyl and lower alkenyl, and A and B are selected from the group consisting, when each is taken separately, of hydrogen, lower alkyl, and lower alkenyl, and, when both are taken together, of an unsaturated hydrocarbon bridge containing 3 to 5 carbon atoms; with formaldehyde, and a primary amine of the formula $$R'—NH_2 \qquad (III')$$

in which R' is selected from the group consisting of lower alkyl, lower alkenyl, lower alkyl containing a hetero linking atom, and lower alkenyl containing a hetero linking atom; to form substituted hexahydro-1,3,5-triazines of the formula

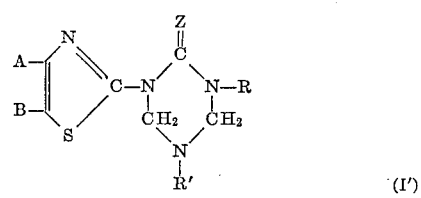

(I')

in which Z, R, R', A and B are the same as defined above. Such reaction is preferably carried out as aforesaid at a temperature substantially between about 0 and 150° C. and preferably in a reaction medium, such as a member selected from the group consisting of cycloaliphatic ethers, dialkyl-alkanoylamides, water, and mixtures thereof. Accordingly, utilizing 1-(2-benzthiazolyl)-3-methylurea and n-butylamine, 1-(2-benzthiazolyl)-3-methyl-5-n-butyl-hexahydro-triazinone-2 is formed. Correspondingly, preferred products are obtained where Z in the foregoing formula is oxygen, R is lower alkyl, A and B together represent a divalent 1,4-butadiene linking group, and R' is γ-methoxy-propyl or methyl or n-butyl or allyl, and also where Z is sulfur, R is lower alkyl, A and B together represent such a divalent 1,4-butadiene linking group, and R' is γ-methoxy-propyl.

Accordingly, the present invention is directed to substituted hexahydro-1,3,5-triazines of the formula

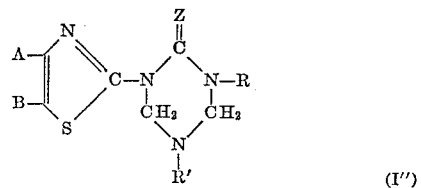

(I'')

in which Z is selected from the group consisting of oxygen and sulfur, R is selected from the group consisting of lower alkyl and lower alkenyl, R' is selected from the group consisting of lower alkyl, lower alkenyl, lower akyl containing a hetero linking atom, and lower alkenyl containing a hetero linking atom, and A and B are selected from the group consisting, when each is taken separately, of hydrogen, lower alkyl, and lower alkenyl, and, when both are taken together, of an unsaturated hydrocarbon bridge containing 3 to 5 carbon atoms.

The present invention is furthermore directed to herbicidal formulations or compositions comprising a carrier vehicle in admixture with such substituted hexahydro-1,3,5-triazines. The substituted triazine in question, of course, is utilized in a herbicidally effective amount, and generally the composition represents a mixture of a dispersible carrier vehicle together with substantially between about 0.1 and 95% by weight of the mixture, and sufficient to destroy weeds, of such a substituted triazine.

Furthermore, the present invention contemplates a method of destroying weeds and the like which comprises applying to such weeds and the soil area where such weeds are growing a herbicidally effective amount of such a substituted triazine. The substituted triazine is preferably applied in an amount substantially between about 2 and 10 kg./hectare in the form of a mixture with a dispersible carrier vehicle such that the application of the substituted triazine is at a concentration of substantially between about 0.01 and 0.5% by weight.

Particular groups of active compounds in accordance with the present invention include those of the type defined hereinabove in which:

(1) Z is sulfur, R is methyl, A and B together represent a divalent 1,4-butadiene linking group, and R' is either butyl or allyl;

(2) Z is sulfur, R is allyl, A and B together represent a divalent 1,4-butadiene linking group, and R' is either butyl or methyl;

(3) Z is oxygen, R is methyl, A and B together represent a divalent 1,4-butadiene linking group, and R' is either ethyl, propyl, γ-methyl amino propyl, or γ-dimethyl amino propyl;

(4) Z is oxygen, R is methyl, A represents methyl, B represents hydrogen, and R' is either propyl, butyl, or allyl; and (5) Z is sulfur, R is methyl, A represents methyl, B represents hydrogen, and R' is methyl or allyl.

Accordingly, the symbols Z, R, A, B and R' as used herein, i.e., both in the specification and claims, may be defined as follows:

Z contemplates oxygen or sulfur;

R contemplates a hydrocarbon radical containing 1–4 carbon atoms, preferably a $C_1$–$C_4$ lower aliphatic radical including lower alkyl and lower alkenyl, especially $C_1$–$C_4$ lower alkyl, such as methyl, ethyl, n-propyl, iso-propyl, n-butyl, iso-butyl, sec.-butyl, tert.-butyl, and the like, and $C_2$–$C_4$ alkenyl, such as vinyl, allyl, butenyl, and the like;

A and B, each taken alone, contemplates hydrogen or a hydrocarbon radical containing 1–4 carbon atoms, preferably a $C_1$–$C_4$ lower aliphatic radical including lower alkyl and lower alkenyl, especially $C_1$–$C_4$ lower alkyl, such as methyl, ethyl, n-propyl, iso-propyl, n-butyl, iso-butyl, sec.-butyl, tert.-butyl, and the like, and $C_2$–$C_4$ alkenyl, such as vinyl, allyl, butenyl, and the like.

A and B together contemplate a hydrocarbon bridge member containing 3 to 5 carbon atoms, preferably a $C_3$–$C_5$ lower aliphatic radical, including lower alkylene, lower alkenylene, and lower alkadienylene, such as propylene (i.e., trimethylene), butylene (i.e. tetramethylene), pentylene (i.e., pentamethylene), and the like, propenylene, 1- or 2-butenylene, 1- or 2-pentenylene, and the like, propadienylene, 1,2-, 1,3-, 2,3-butadienylene, 1,2-, 1,3-, 1,4-, 2,3-, 2,4-, 3,4-pentadienylene, and R' contemplates a hydrocarbon radical containing 1 to 6 carbon atoms, preferably a $C_1$–$C_6$ lower aliphatic radical, including lower alkyl and lower alkenyl, especially $C_1$–$C_6$ alkyl, such as methyl, ethyl, n-propyl, iso-propyl, n-butyl, iso-butyl, sec.-butyl, tert.-butyl, n-amyl, isoamyl, n-hexyl, iso-hexyl, and the like, and $C_2$–$C_6$ alkenyl, such as vinyl, allyl, butenyl, pentenyl, hexenyl, and the like, also a hydrocarbon radical containing one or more hetero linking atoms, such as oxygen, sulfur, or nitrogen, and including especially:

$C_1$–$C_6$ alkoxy alkyl (i.e., $C_1$–$C_5$ alkoxy-$C_5$–$C_1$ alkyl), such as methoxy-pentyl, ethoxy-butyl, propoxy-propyl, butoxy-ethyl, pentoxy-methyl, and the like;

$C_1$–$C_6$ alkylmercapto alkyl (i.e., $C_1$–$C_5$ alkylmercapto-$C_5$–$C_1$ alkyl), such as methylmercapto-pentyl, ethylmercapto-butyl, propylmercapto-propyl, butylmercapto-ethyl, pentylmercapto-methyl, and the like;

$C_1$–$C_6$ alkylamino alkyl (i.e., $C_1$–$C_5$ alkylamino-$C_5$–$C_1$ alkyl, such as methylamino-pentyl, ethylamino-butyl, propylamino-propyl, butylamino-ethyl, pentylamino-methyl, and the like;

$C_1$–$C_6$ dialkylamino alkyl (i.e., $C_2$–$C_5$ dialkylamino-$C_1$–$C_4$ alkyl), such as dimethylamino-methyl, dimethylamino-ethyl, dimethylamino-propyl, dimethylamino-butyl, methyl - ethylamino - methyl, methyl-ethylamino-ethyl, methyl-ethylamino-propyl, diethylamino-methyl, diethylamino-ethyl, ethyl-propylamino-methyl, and the like; etc.

In particular, in accordance with the present invention, R is preferably a $C_1$–$C_4$ alkyl or $C_2$–$C_4$ alkenyl, such as methyl or allyl; R' is preferably a $C_1$–$C_4$ alkyl or $C_2$–$C_4$ alkenyl, $C_1$–$C_5$ alkoxy-$C_5$–$C_1$ alkyl, $C_1$–$C_5$ alkylamino-$C_5$–$C_1$ alkyl, or $C_2$–$C_5$ dialkylamino-$C_4$–$C_1$ alkyl, such as methyl, ethyl, n-propyl, n-butyl, allyl, methylamino-propyl, dimethylamino-propyl, or methoxy-propyl, i.e., including those radicals containing nitrogen or oxygen as the interrupting hetero atom; A and B each is hydrogen or lower alkyl, or one is hydrogen while the other is lower alkyl, such as hydrogen and/or methyl, as the case may be; and A and B together represent butadien-1,3-ylene-1,4.

It will be appreciated that the instant specification and examples are set forth by way of illustration, and not limitation, and that various modifications and changes may be made without departing from the spirit and scope of the present invention which is to be limited only by the scope of the appended claims.

We claim:

1. Hexahydro-1,3,5-triazine of the formula

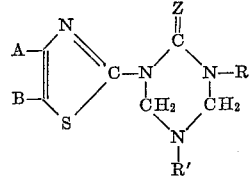

in which Z is selected from the group consisting of oxygen and sulfur, R is selected from the group consisting of lower alkyl and lower alkenyl, R' is selected from the group consisting of lower alkyl, lower alkenyl, lower alkyl containing a hetero linking atom selected from the group consisting of oxygen, nitrogen, and sulfur, and lower alkenyl containing a hetero linking atom selected from the group consisting of oxygen, nitrogen and sulfur, and A and B are selected from the group consisting, when each is taken separately, of hydrogen, lower alkyl, and lower alkenyl, and, when both are taken together, of an unsaturated hydrocarbon bridge containing 3 to 5 carbon atoms.

2. Hexahydro-1,3,5-triazine of the formula

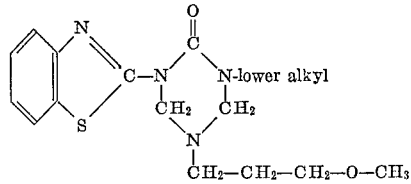

3. Hexahydro-1,3,5-triazine of the formula

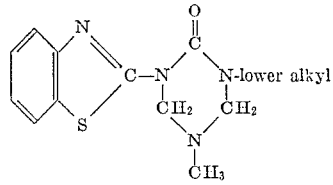

4. Hexahydro-1,3,5-triazine of the formula

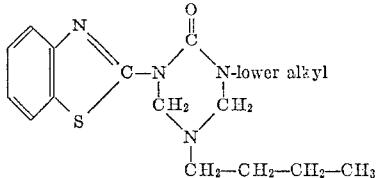

5. Hexahydro-1,3,5-triazine of the formula

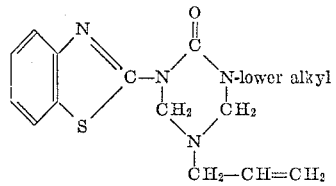

6. Hexahydro-1,3,5-triazine of the formula

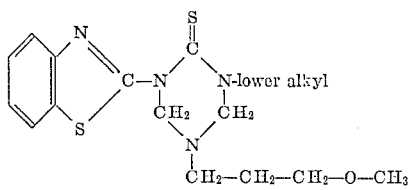

7. The compound 1 - (2 - benzthiazolyl) - 3 - methyl-5 - (γ - methoxy) - propyl - hexahydro - triazinone-2 having the formula

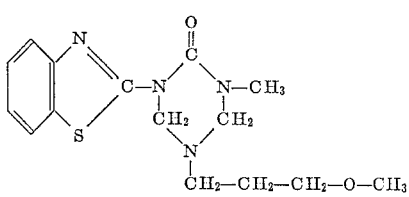

8. The compound 1 - (2 - benzthiazolyl) - 3,5 - dimethyl-hexahydro-triazinone-2 having the formula

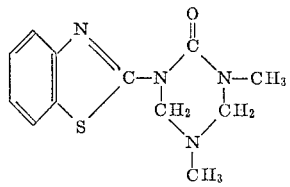

9. The compound 1 - (2 - benzthiazolyl) - 3 - methyl-5-butyl-hexahydro-triazinone-2 having the formula

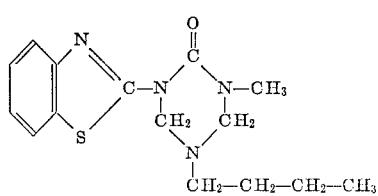

10. The compound 1 - (2 - benzthiazolyl) - 3 - methyl-5-allyl-hexahydro-triazinone-2 having the formula

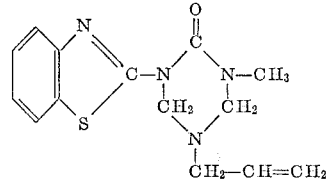

11. The compound 1-(2-benzthiazolyl) - 3-methyl-5-(γ-methoxy) - propyl-hexahydro-triazin-thione-2 having the formula

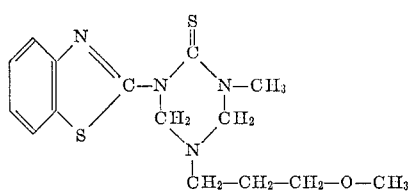

12. The compound 1-(2-benzthiazolyl)-3-methyl-5-butyl-hexahydro-triazin-thione-2 having the formula

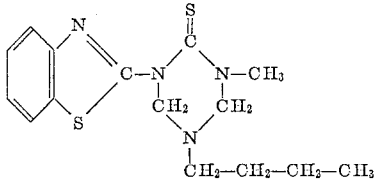

13. The compound 1-(2-benzthiazolyl)-3-methyl-5-allyl-hexahydro-triazin-thione-2 having the formula

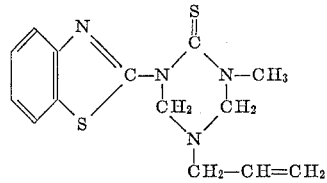

14. The compound 1-(2-benzthiazolyl)-3-allyl-5-methyl-hexahydro-triazin-thione-2 having the formula

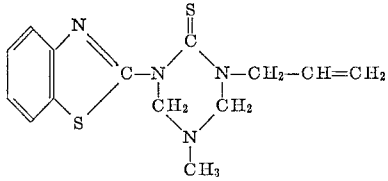

15. The compound 1-(2-benzthiazolyl)-3-allyl-5-butyl-hexahydro-triazin-thione-2 having the formula

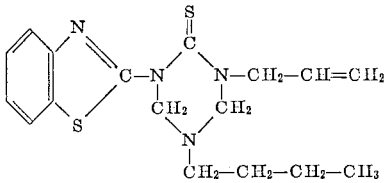

16. The compound 1 - (2-benzthiazolyl)-3-methyl-5-ethyl-hexahydro-triazinone-2 having the formula

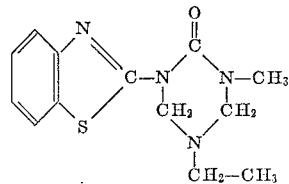

17. The compound 1-(2-benzthiazolyl)-3-methyl-5-propyl-hexahydro-triazinone-2 having the formula

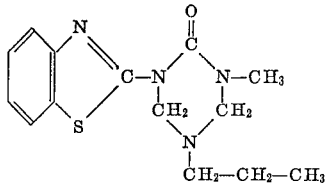

18. The compound 1-(2-benzthiazolyl)-3-methyl-5-(γ-methylamino)-propyl-hexahydro-triazinone-2 having the formula

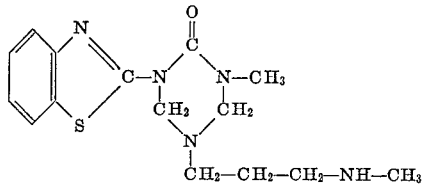

19. The compound 1-(2-benzthiazolyl)-3-methyl-5-(γ-dimethylamino)-propyl-hexahydro-triazinone-2 having the formula

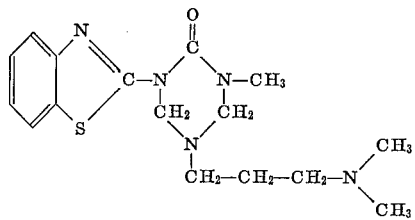

20. The compound 1-(4'-methylthiazol-2'-yl)-3-methyl-5-propyl-hexahydro-triazinone-2 having the formula

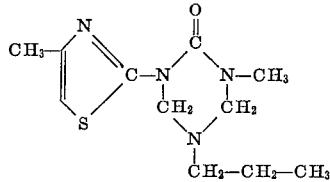

21. The compound 1-(4'-methylthiazol-2'-yl)-3-methyl-5-butyl-hexahydro-triazinone-2 having the formula

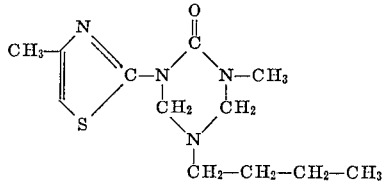

22. The compound 1-(4'methylthiazol-2'-yl)-3-methyl-5-allyl-hexahydro-triazinone-2 having the formula

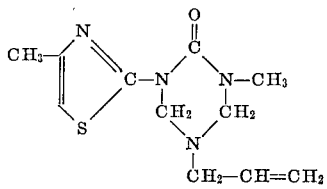

23. The compound 1-(4'-methylthiazol-2'-yl)-3,5-dimethyl-hexahydro-triazin-thione-2 having the formula

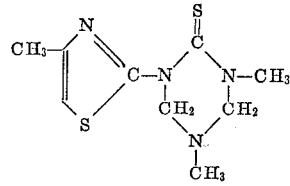

24. The compound 1-(4'-methylthiazol-2'-yl)-3-methyl-5-allyl-hexahydro-triazin-thione-2 having the formula

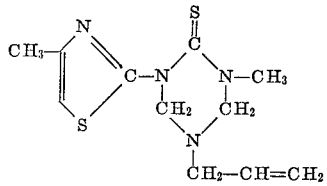

25. The compound 1-(4'-methylthiazol-2'-yl)-3,5-dimethyl-hexahydro-triazinone-2 having the formula

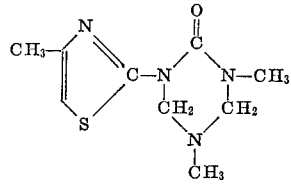

26. The compound 1-(4',5'-dimethylthiazol-2'-yl)-3,5-dimethyl-hexahydro-triazinone-2 having the formula

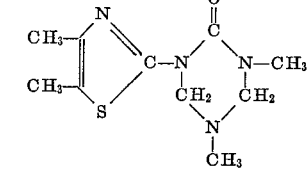

27. The compound 1-(4',5'-dimethylthiazol-2'-yl)-3-methyl-5-butyl-hexahydro-triazinone-2 having the formula

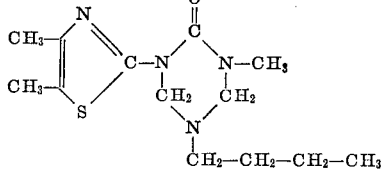

References Cited
UNITED STATES PATENTS
2,641,584   6/1953   Martone _____ 260—248 X
3,152,111   10/1964  Taber _____ 260—248 X

OTHER REFERENCES
Smolin et al.: "S-Triazine and Derivatives," Interscience Publishers Inc., New York (1959), pp. 537–8.

JOHN D. RANDOLPH, *Primary Examiner.*

J. O. THOMAS, W. A. MODANCE, *Examiners.*

A. J. ADAMCIK, J. M. FORD, *Assistant Examiners.*